United States Patent [19]

Johnson et al.

[11] 4,081,174
[45] Mar. 28, 1978

[54] GATE VALVE

[75] Inventors: Thomas B. Johnson, Humble; Larry D. Leva, Houston, both of Tex.

[73] Assignee: Armco Steel Corporation, Middletown, Ohio

[21] Appl. No.: 764,379

[22] Filed: Jan. 31, 1977

[51] Int. Cl.² .................................. F16K 3/316
[52] U.S. Cl. ...................... 251/327; 251/328
[58] Field of Search .................. 251/327, 328, 329

[56] References Cited
U.S. PATENT DOCUMENTS

| | | | |
|---|---|---|---|
| 2,954,044 | 9/1960 | Volpin | 251/327 X |
| 3,032,310 | 5/1962 | Hansen | 251/327 |
| 3,768,774 | 10/1973 | Baugh | 251/327 X |

Primary Examiner—Arnold Rosenthal
Attorney, Agent, or Firm—Melville, Strasser, Foster

[57] ABSTRACT

A gate valve for high and low pressure service conditions. Flanges extend from side edges of the gate member, the width of the gate member through the flanges being substantially identical to the diameter of the cylindrical valve chamber in the valve body. A relief is provided on either side of the valve chamber and so positioned that the flanges are received therein when the gate member is in the closed position, whereby the gate member is not guided in the closed position to eliminate any possible binding thereof. A cylindrical recess is formed in the wall of the valve chamber encircling each inlet and outlet opening, the recesses being concentric, and a valve seat is received in each recess. Each valve seat is provided with a bore therethrough coaxial with the flow passage and comprises a cylindrical portion received within its respective recess and an enlarged portion within the valve chamber in abutment with and supported from wedging by the adjacent surface of the valve chamber and presenting a planar surface adjacent the surface of the gate member.

15 Claims, 9 Drawing Figures

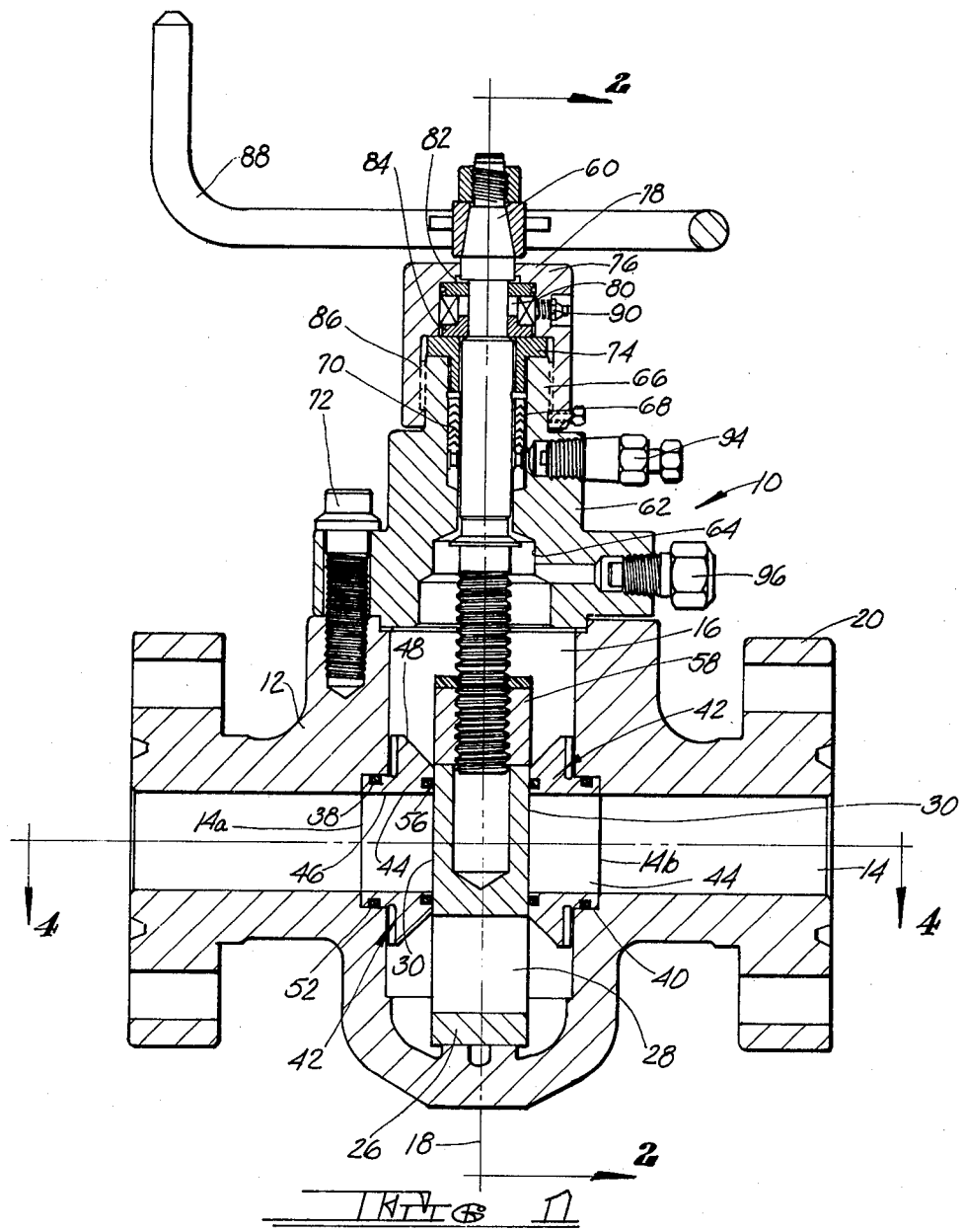

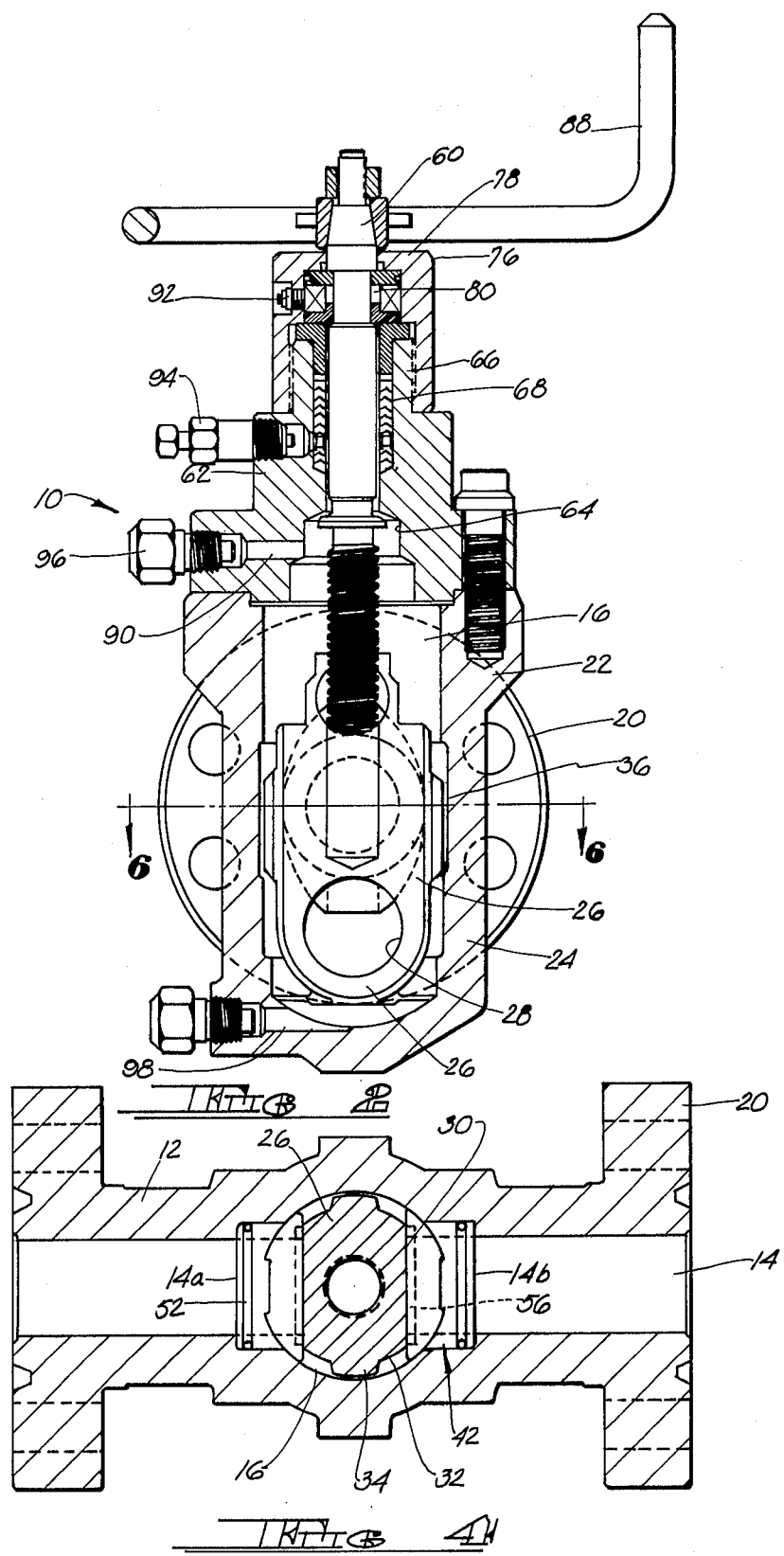

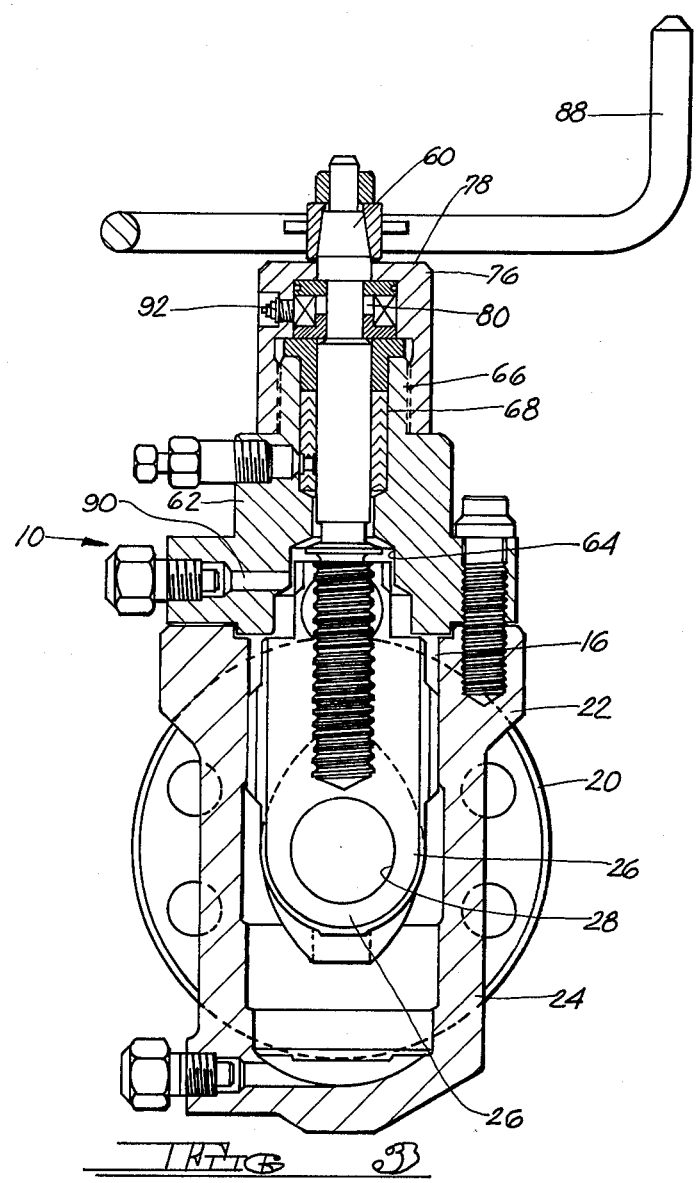

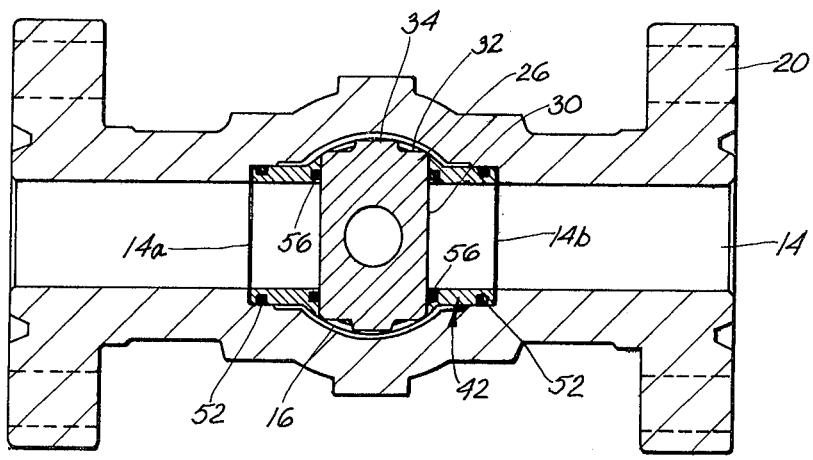
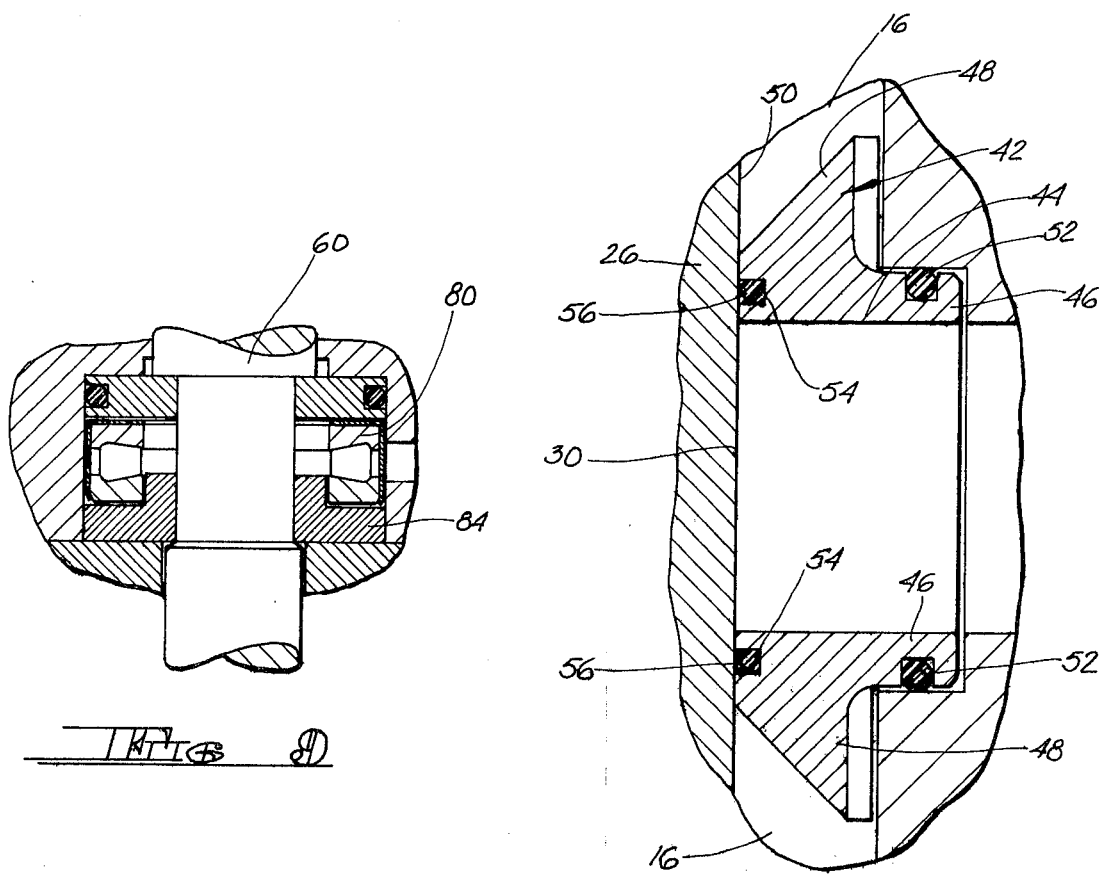

GATE VALVE

SUMMARY OF THE INVENTION

The present invention provides a gate valve having a valve body formed with a flow passage. A cylindrical valve chamber having a vertical axis is formed in the valve body and intersects the flow passage to define diametrically opposed inlet and outlet openings in the valve chamber. A gate member having parallel planar sealing surfaces and side edges is disposed for movement within the valve chamber from a first position closing the flow passage to a second position wherein the flow passage is opened. Operating means extending through the valve body into the valve chamber and operatively connected with the gate member are provided to move the gate member between the first and second positions and arranged to permit movement of the gate member transversely to the flow passage. A flange is provided extending from each one of the edges of the gate member, the width of the gate member through the flanges being substantially identical to the diameter of the cylindrical valve chamber. A relief is provided on either side of the cylindrical valve chamber and so positioned that the flanges are received therein when the gate member is in the first or closed position, whereby the gate member is not guided in the closed position in order to eliminate any possible binding thereof.

In a further embodiment of the present invention a cylindrical recess is formed in the wall of the valve chamber encircling each inlet and outlet opening, the circular recesses being concentric, and a valve seat is received in each recess. The valve seat comprises a cylindrical portion just nicely received within the recess and an enlarged portion within the valve chamber in abutment with and supported from wedgeing by the adjacent surface of the valve chamber and presenting a planar surface adjacent the surface of the gate member, each valve seat having a bore therethrough coaxial with the flow passage. In practice, each of the valve seats is supported from wedging and allows improved support from the moment created in opening and closing the gate member.

BRIEF DESCRIPTION OF THE DRAWING

FIG. 1 is a fragmentary, axial section through the gate valve of the present invention, with the plane of the section coincident with the axis of the flow passageway therethrough, and when the gate member is in the closed position.

FIG. 2 is a fragmentary cross-sectional view taken along the line 2—2 of FIG. 1.

FIG. 3 is a view similar to FIG. 2 when the gate member is in the opened position.

FIG. 4 is a cross-sectional view taken on the line 4—4 of FIG. 1.

FIG. 5 is a cross-sectional view similar to FIG. 4 when the gate member is in the opened position.

FIG. 6 is a cross-sectional view taken on the line 6—6 of FIG. 2.

FIG. 7 is an enlarged fragmentary cross-sectional view of a valve seat according to the present invention.

DESCRIPTION OF THE PREFERRED EMBODIMENTS

Figure 8:
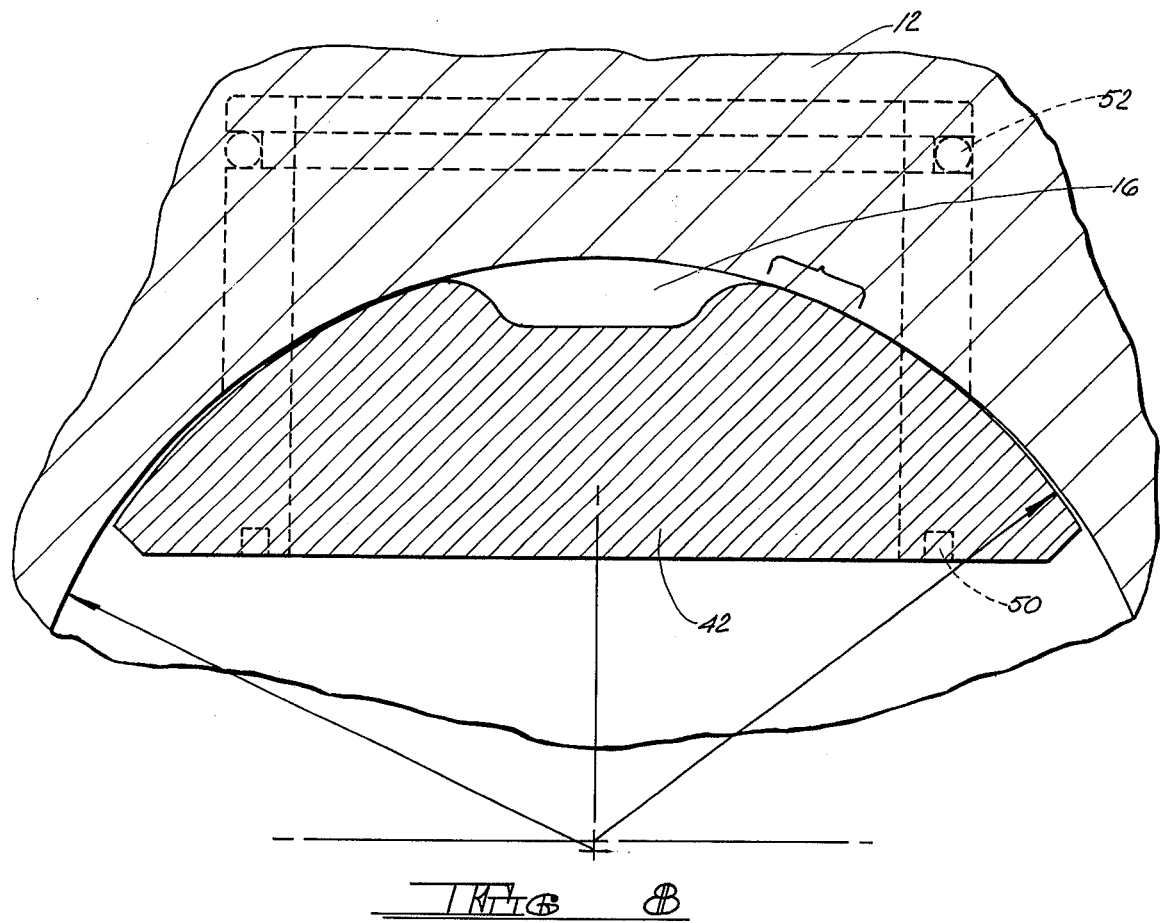
FIG. 8 is a schematic representation showing the difference between the radii of a valve seat and the valve body of the gate valve of the present invention.

Referring to the drawings and to FIGS. 1 through 3, in particular, shown therein and generally designed by the reference character 10 is a gate valve constructed in accordance with the present invention. The gate valve 10 includes a valve body 12 formed with a flow passage 14. A cylindrical valve chamber 16 having a vertical axis 18 is formed in the valve body 12 and intersects the flow passage 14 to define diametrically opposed inlet and outlet openings 14a and 14b in the valve chamber 16. It will, of course, be understood that either of the openings 14a and 14b can serve as either the inlet or the outlet so that the valve 10 may be used to control flow in either direction. The valve body 12 is provided with flanges 20 adjacent the outer ends of the flow passage 14 to facilitate connection of the flow passage 14 with suitable conduits (not shown). The flanges 20 are, of course, merely exemplary, as the gate valve 10 may be used in clamped, threaded and welded connections.

The valve body 12, which is preferably cast or forged, includes upper and lower extensions 22 and 24, respectively, and the cylindrical valve chamber 16 extends through the body 12 transversely with respect to the axis of the flow passage 14 and through both extensions 22 and 24. A rectangularly shaped gate member 26 is mounted for movement within the valve chamber 16. The gate member 26 is provided with a circular port 28 which is adapted to be aligned with, and moved out of alignment with, the flow passage 14 by movement of the gate member 26 within the chamber 16.

The gate member 26 is provided with parallel planar sealing surfaces 30 and side edges 32. A flange 34 extends from each one of the side edges 32 of the gate member 26. The width of the gate member 26 through the flanges 34 is substantially identical to the diameter of the cylindrical valve chamber 16. A relief 36 is concentrically located with the cylindrical valve chamber 16 and is so positioned that the flanges 34 are received therein when the gate member 26 is in the closed position and the port 28 is out of alignment with the flow passage 14. This assures that the gate member 26 will not be guided in the closed position and eliminates any possible binding thereof.

As best seen in FIGS. 1, 4, 5, 6 and 7 a circular recess 38 is formed in the wall of the valve chamber 16 encircling the inlet opening 14a. A similar circular recess 40 is formed in the wall of the valve chamber 16 encircling the outlet opening 14b. The recesses 38 and 40 are concentric. A valve seat 42 having a bore 44 therethrough coaxial with the flow passage 14 is received in each recess 38, 40. Each valve seat 42 comprises a cylindrical portion 46 just nicely received within its respective recesses 38, 40 and an enlarged portion 48 within the valve chamber 16 in abutment with and supported from wedging by the adjacent surface of the valve chamber 16 and presenting a planar surface 50 adjacent the surface 30 of the gate member 26. As can be seen from FIG. 8, the surface of the valve seat 42 in abutment with the surface of the valve chamber 16 has substantially the same radius as the cylindrical valve chamber 16.

At least one seal ring 52 makes a tight seal between the cylindrical portion 46 of each valve seat and its respective recess 38, 40 in the wall of the valve chamber 16. In addition, the surface 50 of each valve seat adjacent the surface 30 of the gate member 26 is provided with an annular groove 54 around the bore 44, and an O ring 56 is mounted in the groove 54 to make a tight seal between the surface 30 of the gate member 26 and the surface 50 of the valve seat 42.

As can be seen, the gate member 26 is disposed for movement in the valve chamber 16 between the valve seats 42 in the recesses 38 and 40 at the inlet and outlet openings 14a and 14b, respectively, from a first position closing the flow passage 14, in which case the circular port 28 is out of alignment with the flow passage 14, to a second position wherein the flow passage is open, in which case the circular port 28 is adapted to be aligned with the flow passage 14. Operating means are provided extending through the valve body 12 into the valve chamber 16 and with the gate member to move the gate member 26 between the aforementioned first and second positions and arranged to permit movement of the gate member 26 transversely to the flow passage 14.

The upper end of the gate member 26 is provided with an extension which retains the gate nut 58 which is threaded internally. The stem of the cylindrical operating rod 60 for the valve 10 is provided at its lower end with external threads to engage the internal threads of the gate nut 58.

Figure 9:
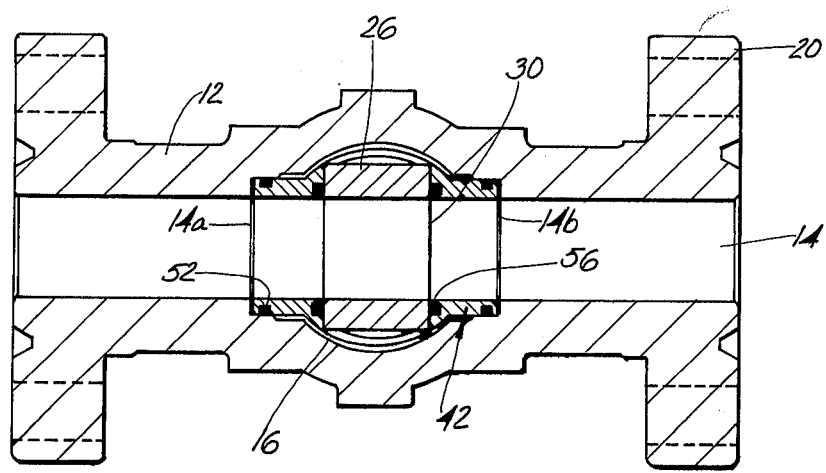
FIG. 9 is an enlarged fragmentary cross-sectional view showing the single stem bearing of the gate valve of the present invention.

A bonnet member 62, having a central aperture 64 for receipt of the stem 60 and a neck portion 66 which forms a packing cavity 68 containing suitable packing 70, is secured by the capscrew 72 to the valve body 12. The packing 70 is retained within the packing cavity 68 by the packing gland 74. A retaining nut 76, provided at its upper end with an inwardly directed flange 78, engages the split ring 82, which engates the single stem thrust bearing 80 (as best seen in FIG. 9), which in turn engages the split ring 84, and is screwed onto the thread 86 formed on the end of the neck portion 68 of the bonnet member 62. A hand wheel 88 is operatively secured to the end of the stem 16.

When the wheel 88 is turned, the valve stem 60 is rotated to move the gate member 26 to its open or closed position, respectively. The axial up and down movement of the valve stem 60 is limited by the single stem thrust bearing 80 between the flange 78 and the gland 74.

As best seen in FIG. 2, port 90 and fitting 96 are provided in the bonnet member 62 to permit injection of valve grease for lubricating the moveable parts of the valve. Similarly, a grease fitting 92 is provided on the retaining nut 76 to permit lubrication of the single stem thrust bearing 80. Similarly, port 92 is provided in bonnet 62 to permit injection of viscous media to energize the packing 68. Body drain port 98 is also provided.

Various resilient materials and configurations may be used for the seal rings 52 and 56, the selection depending somewhat on operating conditions. For example, such materials may include synthetic rubbers, such as Hycar or Neoprene. Also other elastomers can be used, such as nylon or Teflon, which are more resistant to certain chemicals and somewhat harder than synthetic rubbers.

In view of the foregoing, it is evident that the present invention eliminates many of the costly prior art machining operations on valve bodies, since all specialized machining operations are performed on inserted parts, such as on the valve seats 42. Furthermore, the gate valve 10 of the present invention provides improved sealing characteristics with lower actuating torque by means of component simplification for economical manufacture and ease of maintenance. More particularly, the valve seats 42 are supported from wedging by utilizing a back 48 in the form of a radius to conform and support on the diameter of the cylindrical valve chamber 16. The radius of the seat back 48 of the valve seats 42 for support allows economical machining of the cylindrical valve chamber 16. The extended ends of the valve seats 42 allow improved support for the moment created in opening or closing the gate valve 10. The curvature of the seat back 48 of the valve seats 42 acts as a load supporting surface on a conventionally generated diameter. The relief 36 located on either side of the cylindrical valve chamber 16 allows for clearance of the gate member flanges or guides 34 in the closed position to eliminate possibility of binding. Thus, the gate member 26 is guided only in the open position. Finally, the single stem thrust bearing 80 is mounted and loaded in a manner where it supports axial stem loads in both directions. The single stem thrust bearing 80 eliminates duplication of parts.

As many possible variations may be made of the invention without departing from the scope thereof, it is to be understood that all matter herein set forth or shown in the accompanying drawings is to be interpreted as illustrative and not in a limiting sense.

We claim:

1. In a gate valve of the type having a valve body formed with a flow passage, a cylindrical valve chamber having a vertical axis formed in said valve body and intersecting said flow passage to define diametrically opposed inlet and outlet openings in said chamber, a gate member having parallel planar sealing surfaces and side edges and being disposed for movement within said valve chamber from a first position closing said flow passage to a second position wherein said flow passage is opened, and operating means extending through said valve body into said valve chamber and operatively connected with said gate member to move said gate member between said first and second positions and arranged to permit movement of said gate member transversely to said flow passage, the improvement, in combination therewith, comprising a flange extending from each one of said edges of said gate member, the width of said gate member through said flanges being substantially identical to the diameter of said cylindrical valve chamber, and a relief on either side of said cylindrical valve chamber so positioned that said flanges are received therein when said gate member is in said first position, whereby said gate member is not guided in the closed position to eliminate any possible binding thereof.

2. The gate valve according to claim 1, wherein a cylindrical recess is formed in the wall of said valve chamber encircling each said inlet and outlet opening, said circular recesses being concentric, and wherein a valve seat is received in each said recess, said valve seat comprising a cylindrical portion just nicely received within said recess and an enlarged portion within said valve chamber in abutment with and supported from wedging by the adjacent surface of said valve chamber and presenting a planar surface adjacent the the surface of said gate member, said valve seat having a bore therethrough coaxial with said flow passage, whereby each said valve seat is supported from wedging and allows improved support for the moment created in opening and closing said gate member.

3. The gate valve according to claim 2, wherein said surface of said valve seat in abutment with said valve chamber surface has substantially the same radius as said valve cylinder.

4. The gate valve according to claim 2, wherein at least one seal ring makes a tight seal between said cylindrical portion of each said valve seat and its respective recess in the wall of said valve chamber.

5. The gate valve according to claim 2, wherein the surface of each said valve seat adjacent the surface of said gate member is provided with an annular groove around said bore in said valve seat, and wherein a seal ring is mounted in said groove for sealing against said gate member to make a tight seal between said gate member and each said valve seat.

6. In a gate valve of the type having a valve body formed with a flow passage, a cylindrical valve chamber having a vertical axis formed in said valve body and intersecting said flow passage to define opposed inlet and outlet openings in said chamber, and a gate member having parallel planar sealing surfaces and side edges moveable across said valve chamber for opening and closing said flow passage, the improvement, in combination therewith, comprising a cylindrical recess formed in the wall of said valve chamber and circling each said inlet and outlet opening, said circular recesses being concentric, and a valve seat in each said recess, each said valve seat comprising a cylindrical portion just nicely received within its respective recess and an enlarged portion within said valve chamber in abutment with and supported from wedging by the adjacent surface of said valve chamber and presenting a planar surface adjacent the surface of said gate member, said valve seat having a bore therethrough coaxial with said flow passage, whereby each said valve seat is supported from wedging and allows improved support for the moment created in opening and closing said gate member.

7. The gate valve according to claim 6, wherein a flange extends from each one of said edges of said gate member, the width of said gate member through said flanges being substantially identical to the diameter of said cylindrical valve chamber, and wherein a relief is provided on either side of said cylindrical valve chamber so positioned that said flanges are received therein when said gate member is in the closed position, whereby said gate member is not guided in the closed position so as to eliminate any possible binding thereof.

8. The gate valve according to claim 6, wherein said surface of said valve seat in abutment with said valve chamber surface has substantially the same radius as said valve cylinder.

9. The gate valve according to claim 8, wherein at least one seal ring makes a tight seal between the cylindrical portion of each said valve seat and its respective recess in the wall of said valve chamber.

10. The gate valve according to claim 6, wherein the surface of each said valve seat adjacent the surface of said gate member is provided with an annular groove around said bore in said valve seat, and wherein a seal ring is mounted in said groove for sealing against said gate member to make a tight seal between said gate member and said valve seat.

11. A gate valve comprising:
a. a body having means defining a flow passageway therethrough;
b. means defining a cylindrical gate receiving chamber in said body intersecting said passageway intermediate the ends thereof and transverse to the horizontal axis of said passageway;
c. means defining two annular recesses in said body, each circumferentially surrounding a juncture of said passageway and said body;
d. means defining an opening through said body into said chamber at one end of said chamber;
e. a gate member having parallel planar sealing surfaces and side edges received in said chamber through said opening;
f. means defining a flow passageway through said gate member;
g. means for moving said gate member transversely of said body flow passageway to selectively align said body and gate flow passageway in a first position of said gate member and to close off said body flow passageway in a second position of said gate member;
h. a flange extending from each one of said edges of said gate member, the width of said gate member through said flanges being substantially identical to the diameter of said cylindrical valve chamber; and
i. a relief on either side of said cylindrical gate receiving chamber so positioned that said flanges are received therein when said gate member is in said second position.

12. The gate valve according to claim 11, wherein a cylindrical recess is formed in the wall of said gate receiving chamber circling said annular recesses in said body, said cylindrical recesses being concentric, and wherein a valve seat is received in each said recess, said valve seat comprising a cylindrical portion just nicely received within its respective recess and an enlarged portion within said gate receiving chamber in abutment with and supported from wedging by the adjacent surface of said gate receiving chamber and presenting a planar surface adjacent the surface of said gate member, said valve seat having a bore therethrough coaxial with said flow passage, whereby each said valve seat is supported from wedging and allows the improved support for the moment created in opening and closing said gate member.

13. The gate valve according to claim 12, wherein said surface of said valve seat in abutment with said gate receiving chamber surface has substantially the same radius as said cylindrical gate receiving chamber.

14. The gate valve according to claim 12, wherein at least one seal ring makes a tight seal between the cylindrical portion of each said valve seat and its respective recess in the wall of said gate receiving chamber.

15. The gate valve according to claim 12, wherein the surface of each said valve seat adjacent the surface of said gate member is provided with an annular groove around said bore in said valve seat, and wherein a seal ring is mounted in said groove for sealing against said gate member to make a tight seal between said gate member and each said valve seat.

* * * * *